United States Patent
Otsuka

(10) Patent No.: US 8,573,674 B2
(45) Date of Patent: Nov. 5, 2013

(54) VEHICLE SEAT

(75) Inventor: Taiyo Otsuka, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 373 days.

(21) Appl. No.: 13/075,472

(22) Filed: Mar. 30, 2011

(65) Prior Publication Data

US 2011/0241401 A1 Oct. 6, 2011

(30) Foreign Application Priority Data

Apr. 5, 2010 (JP) ................................ 2010-086789

(51) Int. Cl.
*B60N 2/12* (2006.01)
*B60N 2/02* (2006.01)

(52) U.S. Cl.
USPC ............... 296/65.09; 296/65.13; 297/331; 297/340; 297/344.1

(58) Field of Classification Search
USPC ............ 297/331, 344.1, 340, 341; 296/65.13, 296/65.05, 65.09
See application file for complete search history.

(56) References Cited

U.S. PATENT DOCUMENTS

| | | | |
|---|---|---|---|
| 5,158,338 A * | 10/1992 | Hayakawa et al. ......... 297/335 |
| 5,570,931 A | 11/1996 | Kargilis et al. | |
| 5,597,206 A | 1/1997 | Ainsworth et al. | |
| 5,626,392 A | 5/1997 | Bauer et al. | |
| 5,800,015 A * | 9/1998 | Tsuchiya et al. ............ 297/331 |
| 6,152,533 A | 11/2000 | Smuk | |
| 6,883,868 B2 * | 4/2005 | Yoshida ........................ 297/331 |
| 6,935,691 B1 * | 8/2005 | Sasaki et al. ................ 297/344.1 |
| 7,712,829 B2 * | 5/2010 | Park ............................. 297/234 |
| 2008/0122279 A1 * | 5/2008 | Park ............................. 297/332 |
| 2010/0133407 A1 | 6/2010 | Fujieda et al. | |

FOREIGN PATENT DOCUMENTS

| | | |
|---|---|---|
| JP | 58199233 | 11/1983 |
| JP | 2005-22551 | 1/2005 |

OTHER PUBLICATIONS

U.S. Appl. No. 13/097,384 to Kousuke Sei et al., which was filed Apr. 29, 2011.

* cited by examiner

*Primary Examiner* — Milton Nelson, Jr.
(74) *Attorney, Agent, or Firm* — Greenblum & Bernstein, P.L.C.

(57) ABSTRACT

A switching mechanism that switches a locking device of a slider device between a locked state and an unlocked state includes a sliding member that slides along a wall surface of a fixed rail, a step portion that is formed on the wall surface of the fixed rail and onto which the sliding member rides when a seat main body enters an unusable range, an unlocking mechanism that is provided on the seat main body and that unlocks the locking device and keeps the locking device unlocked in response to movement of the sliding member as the sliding member rides onto the step portion, and an unlocking operation canceling mechanism that is provided on the seat main body and that cancels an operation by the unlocking mechanism to unlock the locking device when the seat cushion is flipped up into a tipped up position.

3 Claims, 10 Drawing Sheets

VEHICLE SEAT

INCORPORATION BY REFERENCE

The disclosure of Japanese Patent Application No. 2010-086789 filed on Apr. 5, 2010 including the specification, drawings and abstract is incorporated herein by reference in its entirety.

BACKGROUND OF THE INVENTION

1. Field of the Invention

The invention relates to a vehicle seat. More particularly, the invention relates to a vehicle seat in which a seat main body that is slidably provided on the floor of the vehicle can be placed in a tipped up position, in which a seat cushion is flipped up, and that is locked so as not to slide when the seat main body is in a position in which it has been slid from a predetermined range (i.e., a range within which the seat main body can be fixed when an occupant sits in the seat, i.e., the range in which the seat can be used); hereinafter referred to as the "usable range") to an unusable range that is outside of the predetermined range.

2. Description of the Related Art

Japanese Patent Application Publication No. 2005-22551 (JP-A-2005-22551), for example, describes a vehicle seat structure in which the amount of room behind the seat is increased by flipping up a seat cushion toward the rear and sliding a seat main body forward (in the longitudinal direction of the vehicle) out of a seat-usable range and into an unusable range. This vehicle seat has two types of locking devices for locking the seat main body so that it will not slide. One locking device is a device that locks the seat main body in the seat-usable range only when the seat main body is in a position that allows an occupant to be seated. The other locking device is a device that locks the seat main body in the unusable range only when the seat cushion is in a tipped up position. Providing these two types of locking devices in this way makes it possible to ensure that the seat main body is always used (to sit on) in a safe range, and prevents the seat main body from being used (to sit on) in the unusable range that is outside of the seat-usable range.

However, this technology requires the two types of locking devices, which makes the structure complicated.

SUMMARY OF THE INVENTION

The invention makes it possible to lock a seat main body so that it will not slide in a seat-usable range, and lock the seat main body so that it will not slide in an unusable range, using one type of locking device.

A first aspect of the invention relates to a vehicle seat that is slidably provided on a vehicle floor, that includes a fixed rail that is fixed onto the vehicle floor; a slide rail that is slidably assembled to the fixed rail, a seat main body being provided on an upper portion of the slide rail; a locking device that is provided on the slide rail and that locks the slide rail such that the slide rail will not slide, by engaging with the fixed rail; and a switching mechanism that switches the locking device between a locked state and an unlocked state. The vehicle seat is configured such that the seat main body that is slidably provided on the vehicle floor is able to be locked so as not to slide when the seat main body is in a sittable position as well as when the seat main body is in a tipped up position in which a seat cushion is flipped up, in a preset seat-usable range, and the seat main body is able to be locked so as not to slide by being placed in the tipped up position, in a position in which the seat main body has been slid out of the seat-usable range and into an unusable range. The switching mechanism has a sliding member that is provided on the slide rail and that slides along a wall surface of the fixed rail, a step portion that is formed on the wall surface of the fixed rail and onto which the sliding member rides when the seat main body enters the unusable range, an unlocking mechanism that is provided on the seat main body and that unlocks the locking device and keeps the locking device unlocked in response to movement of the sliding member as the sliding member rides onto the step portion, and an unlocking operation canceling mechanism that is provided on the seat main body and that cancels an operation by the unlocking mechanism to unlock the locking device when the seat cushion is flipped up into the tipped up position.

According to this aspect, the locking device that locks the seat main body in place in the seat-usable range can be kept unlocked by moving the seat main body into the unusable range, such that the sliding member rides onto the step of the fixed rail, which causes the unlocking mechanism to operate. Accordingly, the seat main body can be prevented from being used to sit on in the unusable range. On the other hand, the seat main body can be locked in place even in the unusable range by switching the seat cushion to the tipped up position, such that the unlocking operation canceling mechanism cancels an operation by the unlocking mechanism to unlock the locking device. In this way, the seat main body can be locked in place in the seat-usable range, as well as locked in place in the unusable range by being placed in the tipped up position, using one type of locking device.

In the aspect described above, the unlocking mechanism may include a link that is connected to the locking device, and a first elongated hole that extends in a longitudinal direction of the link may be provided in the link. The unlocking operation canceling mechanism may include a link that is connected to the locking device, and a second elongated hole that extends in a longitudinal direction of the link may be provided in the link. The link of the unlocking mechanism and the link of the unlocking operation canceling mechanism may be connected together by a slide pin that slides in the first elongated hole and the second elongated hole. The unlocking mechanism keeps the locking device unlocked by having the link of the unlocking mechanism rotate in response to the movement of the sliding member, such that the slide pin pushes on the locking device. The unlocking operation canceling mechanism stops the slide pin from pushing on the locking device by having the link of the unlocking operation canceling mechanism rotate such that the slide pin slides along the elongated hole in the link of the unlocking mechanism when the seat cushion is in the tipped up position.

According to this structure, the mechanism by which operation by the unlocking mechanism to unlock the locking device is canceled by the unlocking operation canceling mechanism is embodied by a simple structure in which links with elongated holes in them are connected by a slide pin. By employing a mechanism that slides the slide pin in the elongated holes in this way, the slide pin is able to slide while being engaged with the links, following the movements of the links. Thus, the operation by the unlocking mechanism to unlock the locking device and the operation by the unlocking operation canceling mechanism to cancel this unlocking operation by the unlocking mechanism are able to be stably performed.

In the aspect described above, the unlocking mechanism may include an operating arm that is operated by the sliding member and extends out from the seat main body. The operating arm is arranged facing an upper surface of the sliding member, and the upper surface of the sliding member is provided exposed above the slide rail.

According to this structure, providing the upper surface of the sliding member exposed above the slide rail enables the operating arm to be easily assembled protruding from the seat main body and facing the upper surface of the sliding mechanism provided inside the slide rail.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
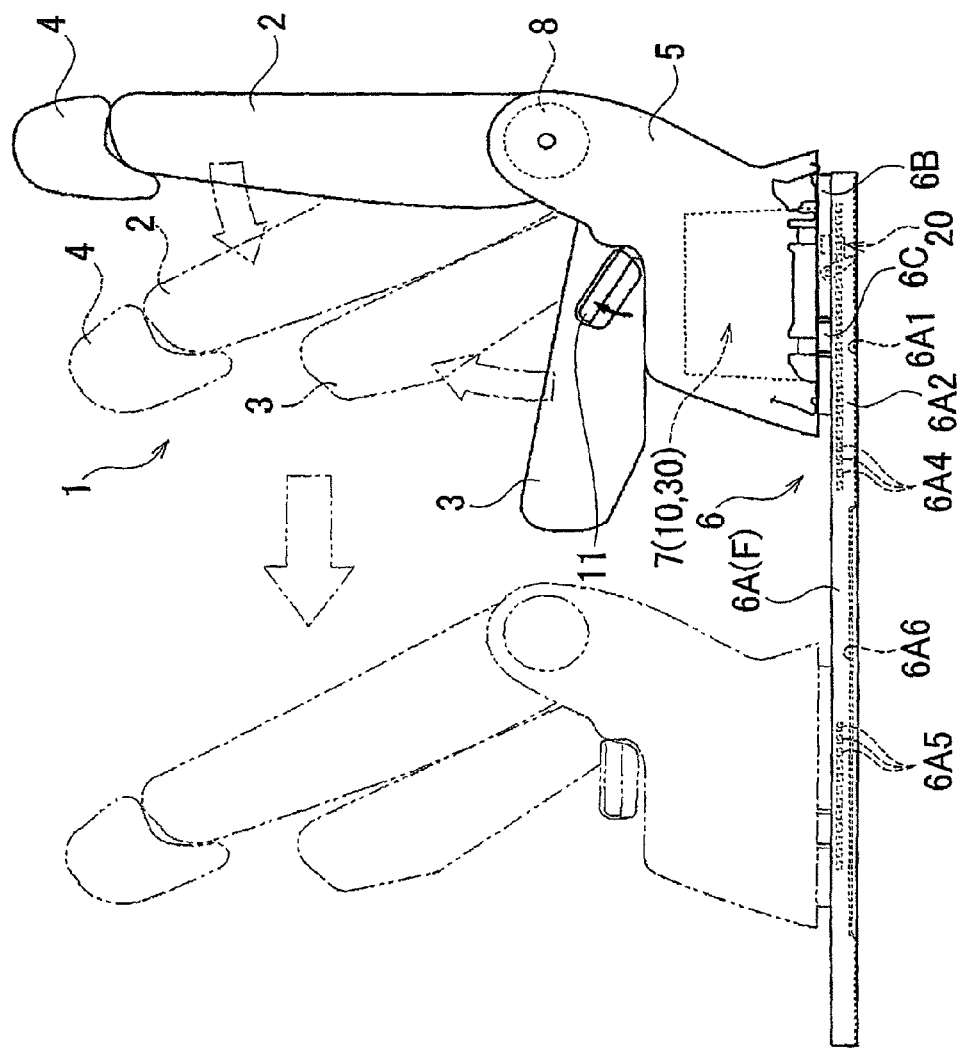
FIG. 1 is a side view schematically showing the structure of a vehicle seat according to an example embodiment of the invention.

First, the structure of a vehicle seat according to an example embodiment will be described with reference to FIGS. 1 to 10. The vehicle seat in this example embodiment is configured such that a seat main body 1 that forms the main body of a seating portion is provided fixed to an upper portion of a pair of left and right slider devices 6 that are arranged on a vehicle floor F, as shown in FIG. 1. Here, the seat main body 1 includes a seat back 2, a seat cushion 3, and a headrest 4. The seat back 2 and the seat cushion 3 are each provided connected to a base plate 5 that is fixed to the upper portion of the slider devices 6.

More specifically, the seat back 2 is structured such that lower end portions on both sides of a back frame, not shown, that forms the skeleton of the seat back 2 are connected to the base plates 5 on both sides via a reclining device 8. By the reclining device 8, the back angle of the seat back 2 with respect to the base plates 5 is always fixed. This back angle can be adjusted by operating a walk-in lever, also not shown, that is provided on the seat main body 1 and unlocks the back angle via a cable, not shown.

Figure 2:
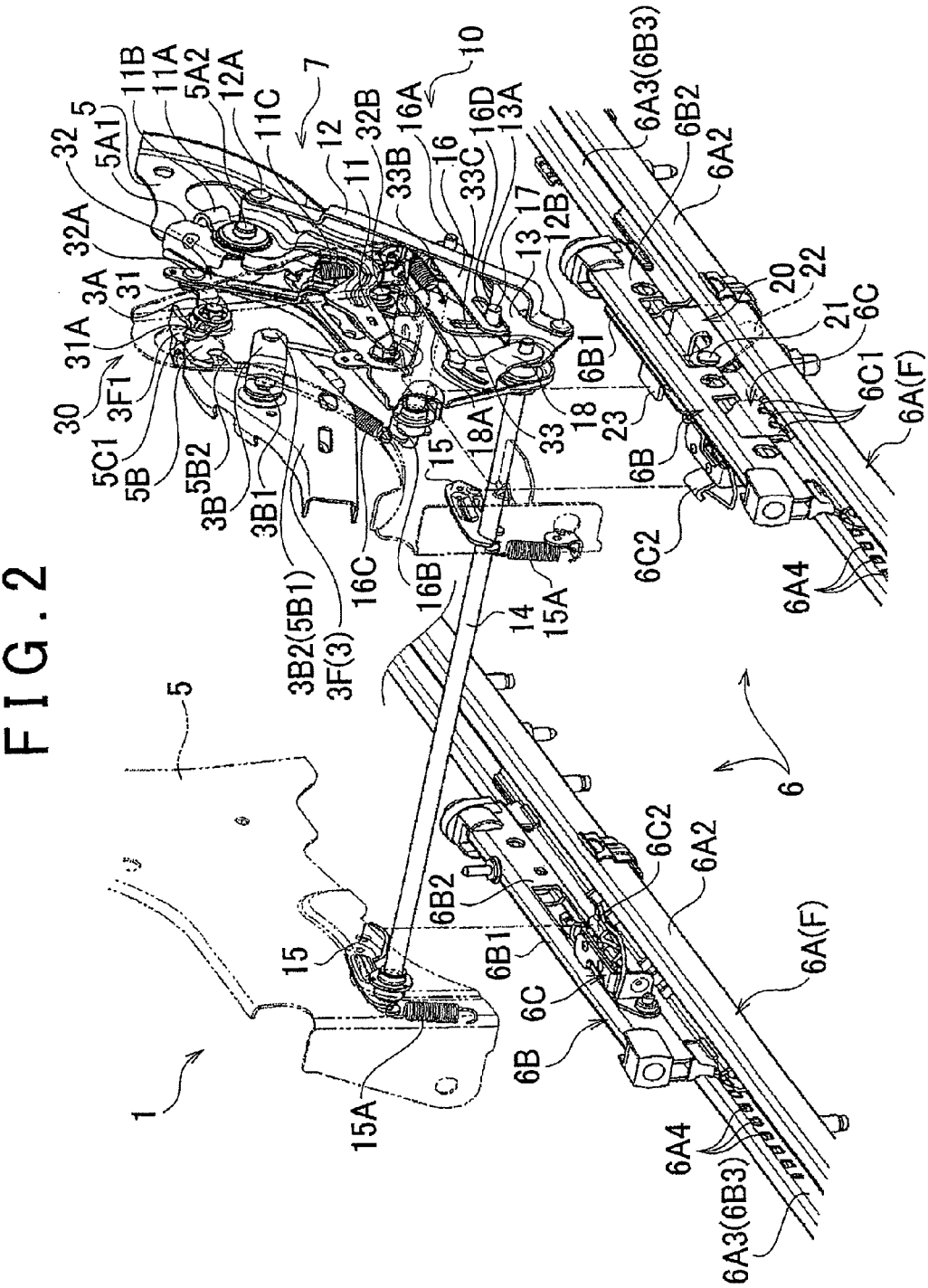
FIG. 2 is an enlarged perspective view of the main structure of the vehicle seat.
Figure 3:
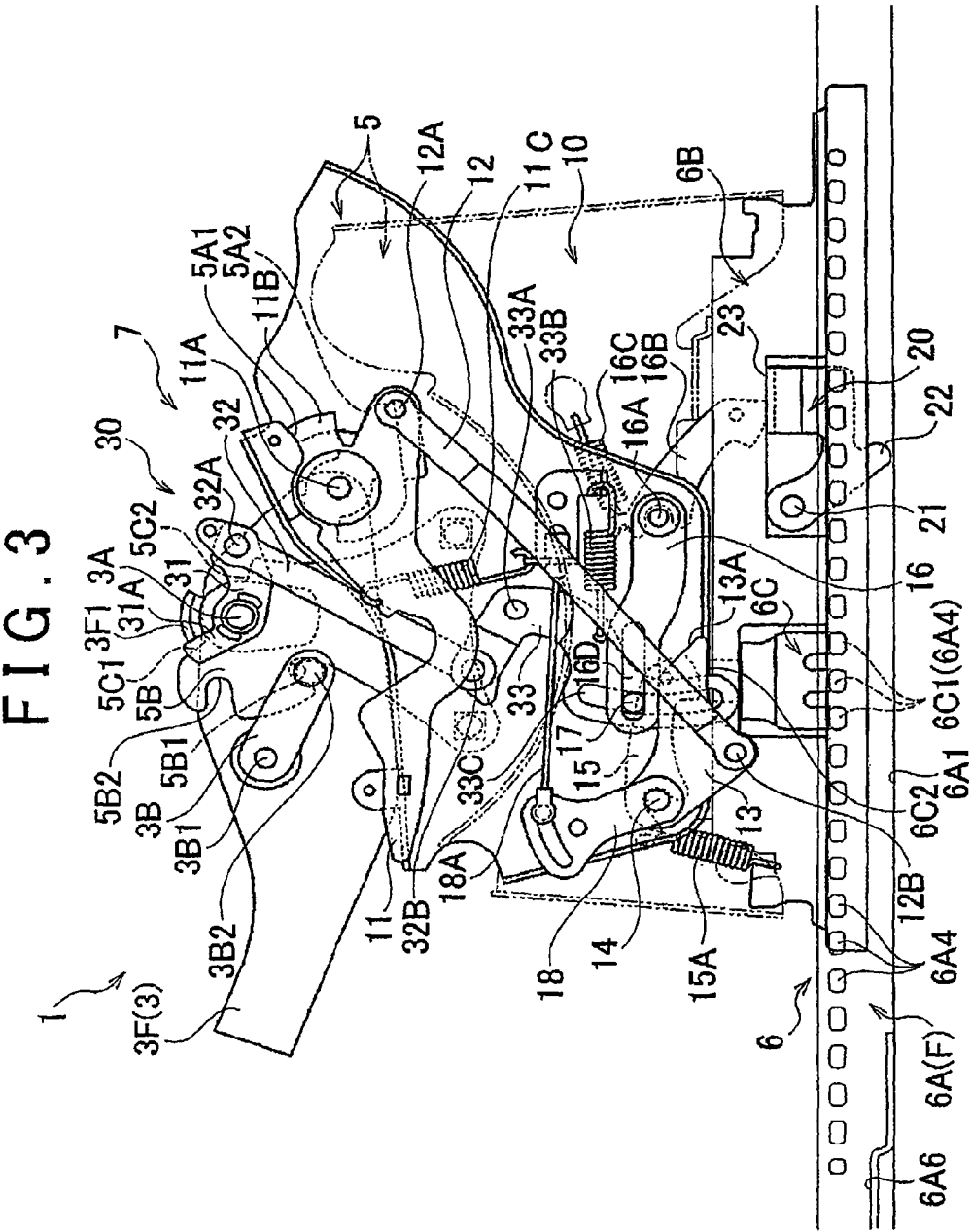
FIG. 3 is a side view of a seat main body that is locked so that it will not slide, in a seat-usable range.

Also, as shown in. FIGS. 2 and 3, the seat cushion 3 is structured such that rear end portions on both sides of a cushion frame 3F that forms the skeleton of the seat cushion 3 are rotatably connected (so as to be able to be raised and lowered) to a fixing plate 5B that is integrally fixed to the base plate 5 on each side by a connecting shaft 3A. More specifically, the seat cushion 3 is able to be rotated (both raised and lowered) with respect to the base plate 5 within a range within which an engaging plate 3F1 that is integrally formed with a rear upper portion of the cushion frame 3F is able to move between a first engaging surface 5C1 formed on the fixing plate 5B and a second engaging surface 5C2 formed on the fixing plate 5B.

The seat cushion 3 is constantly urged in a direction in which it will flip up about the connecting shaft 3A toward the rear of the seat by the urging force of a spring member, not shown, that is arranged between the cushion frame 3F and the base plate 5. However, when the seat cushion 3 is in a state in which it can be used to sit on, it is kept in a down position, in which it is laid down to the front to enable an occupant to sit on it, by fitting (engaging) an engaging pin 3B2 provided on the tip of an engaging arm 3B that is connected to the cushion frame 3F into (with) a first groove 5B1 formed in the fixing plate 5B.

The engaging arm 3B is rotatably connected to the cushion frame 3F by a connecting shaft 3B1. The engaging arm 3B is constantly kept in the position in which the engaging pin 3B2 is fit into the first groove 5B1, with the engaging arm 3B being rotatably urged counterclockwise in the drawing by the urging force of the spring member, not shown. Incidentally, hereinafter, the terms "clockwise" and "counterclockwise" refer to directions with respect to the drawings. When the walk-in lever, not shown, is operated, the engaging arm 3B rotates clockwise against the urging force of the spring member via the cable, not shown, such that the engaging pin 3B2 comes out of the first groove 5B1, and as a result, the seat cushion 3 flips up toward the back of the seat while pivoting about the connecting shaft 3A (see FIG. 6).

When the seat cushion 3 flips up, the engaging arm 3B hangs down from the seat cushion 3 and is pulled upward with respect to the seat. In this pulled up position, the engaging pin 3B2 fits into a second groove 5B2 formed in the fixing plate 5B, and becomes engaged, such that the seat cushion 3 is engaged in the flipped-up position (i.e., a tipped-up position). Also, as shown in FIG. 1, operating the walk-in lever, not shown, also unlocks the back angle of the seat back 2, such that the seat back 2 tilts forward and becomes engaged in this position.

Accordingly, the seat main body 1 is in a forward-tilted position (i.e., a walk-in position) with the seat back 2 and the seat cushion 3 folded up together facing one another. That is, the seat main body 1 is folded up compactly in the longitudinal direction of the vehicle. Also, as shown in FIGS. 2 and 3, when the walk-in lever is operated, a cable 18A that is connected to this walk-in lever pulls on a fourth operating link 18. As a result, a release member 15 that is integrally provided with the fourth operating link 18 rotates clockwise, thus unlocking a locking device 6C of the slider devices 6 that will be described later such that the seat main body 1 is able to slide. Incidentally, hereinafter, the term "lock" refers to fixing an object in a position so that it will not slide, and the term "unlock" refers to unfixing an object from a position in which it had been fixed so that it is able to slide.

As a result, the seat main body 1 becomes unlocked with respect to the vehicle floor F, so the seat main body 1 can be slid into the unusable range that is forward in the vehicle, thereby providing more room behind the seat, as shown in FIG. 1. Incidentally, the locking device 6C of the slider devices 6 can also be unlocked by pulling up on a release lever 11 provided on a side portion of the seat main body 1. The structure of this specific operation will be described in more detail later.

Incidentally, a sliding range within which the vehicle seat can be slid in the longitudinal direction of the vehicle by the slider devices 6 includes a seat-usable range within which the seat main body 1 can be used to sit on, and an unusable range within which the seat main body 1 cannot be used to sit on. The seat-usable range is a range within which belt webbing of a seatbelt apparatus, not shown, provided on a side wall of the vehicle is able to be wrapped around the body of a seated occupant and effectively restrain the occupant. The unusable range is a range in front of the seat-usable range (in the longitudinal direction of the vehicle), and is set as a range within which the seat main body 1 is unable to be used to sit on because the belt tubing of the seatbelt apparatus, not shown, is unable to reach.

When the vehicle seat is positioned in the seat-usable range, the locking device 6C (see FIGS. 2 and 3) is always locked so that it will not slide. The locking device 6C can be unlocked by pulling up on the release lever 11 described above. Unlocking the locking device 6C enables the seat main body 1 to be slid forward in the longitudinal direction of the vehicle and thus be moved into the unusable range.

Figure 5:
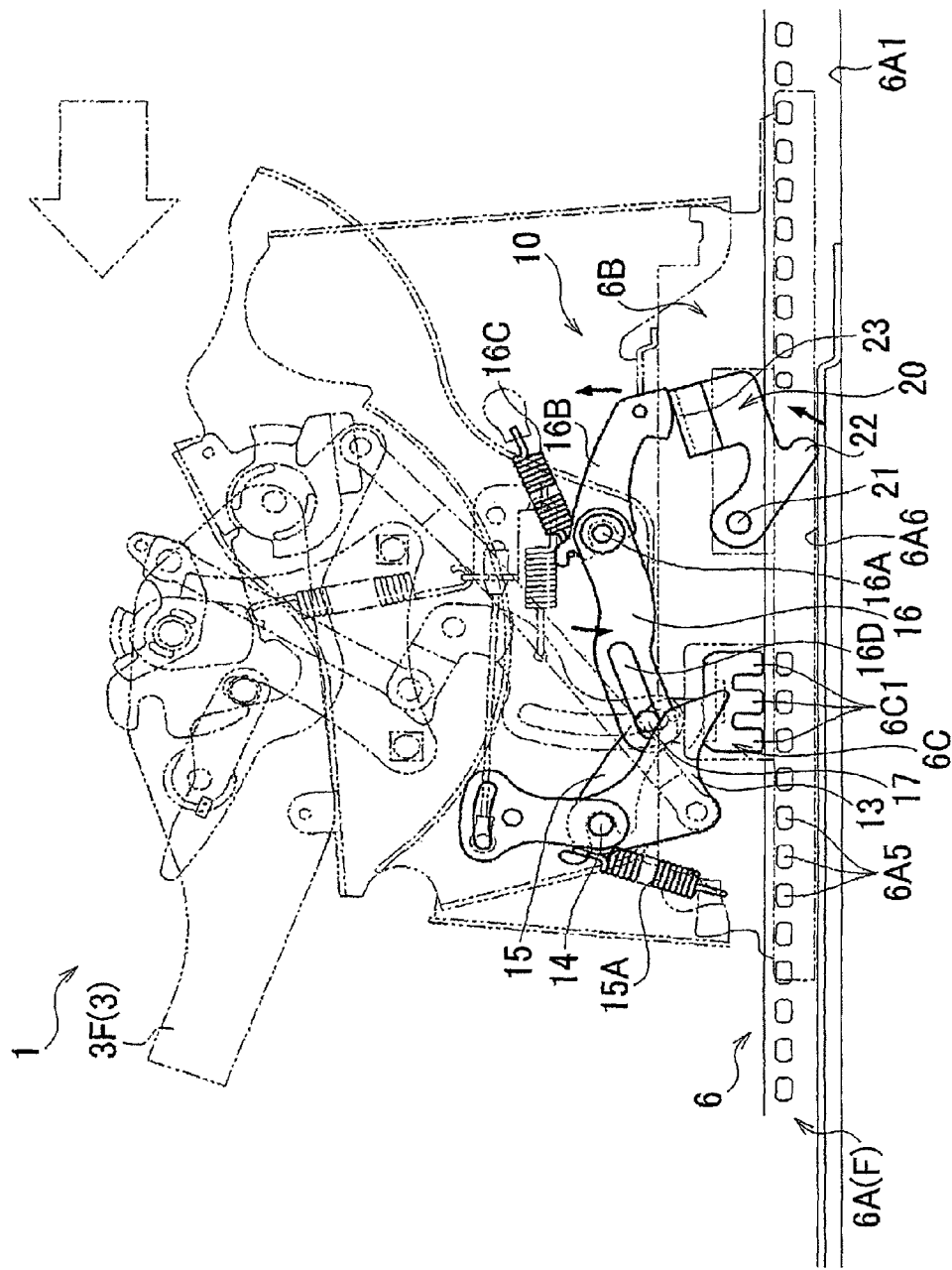
FIG. 5 is a side view of the seat main body after it has been slid to an unusable range from the state shown in FIG. 4.

When the vehicle seat is positioned in the seat-usable range, it can be locked in place by releasing (i.e., lowering) the release lever 11, such that the locking device 6C becomes locked again (i.e., is urged into the locked state again). However, as shown in FIG. 5, if the release lever 11 is operated (i.e., pulled up) and the seat main body 1 is slid into the unusable range while in a sittable position (i.e., a position that allows it to be sat on), the locking device 6C is prevented from locking, even if the release lever 11 is released.

As a result, the seat main body 1 is prevented from being sat on in the unusable range. However, when the vehicle seat is in the unusable range, the seat main body 1 can be locked in place by switching the locking device 6C to a locked state, which is accomplished by operating the walk-in lever and tipping up the seat cushion 3.

Hereinafter, the structure of a switching mechanism 7 that switches the state of the locking device 6C of the slider devices 6 between a locked state and an unlocked state will be described. First, the structure of the slider devices 6 will be described. As shown in FIG. 2, each slider device 6 includes a fixed rail 6A that is integrally fixed to the vehicle floor F, a slide rail 6B that is slidably assembled to the fixed rail 6A in the longitudinal direction of the seat (i.e., the longitudinal direction of the vehicle), and the locking device 6C that can lock the slide rail 6B in place with respect to the fixed rail 6A.

The fixed rail 6A is formed by a single long steel sheet that is bent in the shorter direction in places. This fixed rail 6A has a bottom surface portion 6A1 that faces up with respect to the seat, side portions 6A2 that stand upright with respect to the seat from edge portions on both the left and right sides of the bottom surface portion 6A1, and bent back portions 6A3 that are bent back downward toward each other from upper edge portions of both of the side portions 6A2. Meanwhile, the slide rail 6B is also formed of a single steel sheet that is bent in the shorter direction in places. The slide rail 6B has an upper portion 6B1 that faces up with respect to the seat, side portions 6B2 that extend downward with respect to the seat from edge portions on both the left and right sides of the upper portion 6B1, and fin portions 6B3 that are bent back so as to rise up and away from each other on the lower edge portions of both of the side portions 6B2.

The slide rail 6B is slidably assembled to the fixed rail 6A in the longitudinal direction by longitudinally inserting both fin portions 6B3 of the slide rail 6B into the spaces formed by the bent back portions 6A3 of the fixed rail 6A being bent back, from an open end portion at either the front or the back of the fixed rail 6A, such that the upper portion 6B1 of the slide rail 6B is exposed protruding up with respect to the seat from the gap between the bent back portions 6A3 of the fixed rail 6A. Thus, the slide rail 6B is kept from detaching from the fixed rail 6A in the upward direction due to the fin portions 6B3 catching on the bent back portions 6A3 of the fixed rail 6A.

The locking device 6C is rotatably connected to the slide rail 6B by a shaft pin, not shown, the axis of which extends in the longitudinal direction of the slide rail 6B. This locking device 6C has three lock pawls 6C1 on the tip, and is constantly urged in a direction in which these lock pawls 6C1 engage with lock holes 6A4 (in the seat-usable range; see FIG. 3) or lock holes 6A5 (in the unusable range; see FIG. 5) that are formed through the bent back portions 6A3 of the fixed rail 6A, by the urging force of a spring member, not shown.

Thus, the slide rail 6B is locked to the fixed rail 6A by the slide rail 6B being placed in a position where the lock pawls 6C1 line up with the lock holes 6A4 (see FIG. 3) or the lock holes 6A5 (see FIG. 5) such that the lock pawls 6C1 are urged to engage with the lock holes 6A4 or the lock holes 6A5.

As shown in FIG. 2, the locking device 6C is able to be unlocked by a push plate portion 6C2 of the locking device 6C being pushed downward by a release member 15 of an unlocking mechanism 10, such that the locking device 6C is pushed around in a direction against the urging force, and the lock pawls 6C1 come out of (i.e., disengage from) the lock holes 6A4 or the lock holes 6A5.

Next, the structure of the switching mechanism 7 that switches the state of the locking device 6C between a locked state and an unlocked state will be described. As shown in FIGS. 2 and 3, the switching mechanism 7 includes a sliding member 20, a raised step portion 6A6, the unlocking mechanism 10, and an unlocking operation canceling mechanism 30. The sliding member 20 is provided on the slide rail 6B and slides along the upper surface of the bottom surface portion 6A1 of the fixed rail 6A. The raised step portion 6A6 is formed on the bottom surface portion 6A1 of the fixed rail 6A. The sliding member 20 rides up on this raised step portion 6A6 when the seat main body 1 comes into a position in the unusable range. The unlocking mechanism 10 is provided on the seat main body 1 and unlocks the locking device 6C using the movement of the sliding member 20 as it rides up on the raised step portion 6A6. The unlocking operation canceling mechanism 30 is provided on the seat main body 1 and cancels the unlocking operation by the unlocking mechanism 10 on the locking device 6C when the seat cushion 3 is in the tipped up position. Here, the raised step portion 6A6 serves as the step portion of the invention.

As shown in FIGS. 2 and 3, the sliding member 20 is rotatably connected to the slide rail 6B by a connecting shaft 21. A horn-shaped sliding protrusion 22 that protrudes downward is constantly kept pressed against the upper surface of the bottom surface portion 6A1 of the fixed rail 6A by gravity. This sliding member 20 is configured such that when the seat main body 1 enters the unusable range, the sliding protrusion 22 rides up on the raised step portion 6A6 formed on the bottom surface portion 6A1 of the fixed rail 6A, which causes the sliding protrusion 22 to rotate counterclockwise about the connecting shaft 21, as shown in FIG. 5.

As shown in FIGS. 2 and 3, the unlocking mechanism 10 includes the release lever 11, a first operating link 12, a second operating link 13, a connecting shaft 14, the release member 15, a third operating link 16, a slide pin 17, and the fourth operating link 18. Here, the third operating link 16 serves as a link that forms the unlocking mechanism of the invention. The release lever 11 is rotatably connected to the base plate 5 by a connecting shaft 11A and rotates relative to the base plate 5. The release lever 11 pivots within a range within which an engaging plate 11B formed bent at a rear edge portion of the release lever 11 moves between an upper engaging surface 5A1 formed on the base plate 5 and a lower engaging surface 5A2 formed on the based plate 5.

The release lever 11 is constantly urged to rotate counterclockwise by the urging force of a tension spring 11C strung between the release lever 11 and the base plate 5, and is kept engaged in a state (i.e., an initial position) in which it has been pulled down to a position in which the engaging plate 11B abuts against the upper engaging surface 5A1. The first operating link 12 is a long link, with the upper end portion in the drawing rotatably connected by a connecting pin 12A to an end portion of the release lever 11 that extends farther toward the rear than the connecting shaft 11A, and the lower end portion in the drawing rotatably connected to the second operating link 13 by a connecting pin 12B.

The second operating link 13 is rotatably connected to the base plate 5 by the connecting shaft 14. More specifically, as shown in FIG. 2, the second operating link 13 is integrally fixed to the connecting shaft 14, and the connecting shaft 14 is rotatably connected to the base plate 5. Furthermore, the two release members 15 that unlock the locking device 6C of the slider devices 6 are integrally fixed to the connecting shaft 14.

Moreover, the fourth operating link 18 that rotates when pulled by the cable 18A when the walk-in lever, not shown, is operated is also integrally fixed to the connecting shaft 14. That is, the release members 15, the second operating link 13, and the fourth operating link 18 are integrally connected to the connecting shaft 14, such that these all rotate as a single unit.

Initially, before the release lever 11 is pulled up, the release lever 11 is prevented from rotating counterclockwise in the initial position. The release members 15, the second operating link 13, and the fourth operating link 18 are connected to the release lever 11 via the first operating link 12, and are also prevented from rotating counterclockwise in the initial positions shown in FIG. 3. Here, the tension spring 15A that urges the release members 15 to rotate counterclockwise about the connecting shaft 14 shown in FIG. 3 is strung between each of the release members 15 and the base plate 5.

Therefore, the urging force that is applied to the release members 15 to urge them to rotate counterclockwise is further increased in a manner that also assists the urging force of the tension spring 11C that is applied to the release lever 11. Next, the third operating link 16 is rotatably connected to the base plate 5 by a connecting shaft 16A, as shown in FIGS. 2 and 3. More specifically, the third operating link 16 is integrally fixed to the connecting shaft 16A, and the third operating link 16A is rotatably connected to the base plate 5.

Furthermore, an operating arm 16B that extends downward to a position opposite an upper plate portion 23 of the sliding member 20 provided on the slide rail 6B of the slider devices 6 described above is provided integrally fixed to the connecting shaft 16A. That is, the third operating link 16 and the operating arm 16B are both integrally connected to the connecting shaft 16A, such that these all rotate as a single unit. The third operating link 16 and the operating arm 16B are constantly urged to rotate clockwise about the connecting shaft 16A shown in FIG. 3 by the urging force of a tension spring 16C that is strung between the operating arm 16B and the base plate 5, and thus are kept in a state in which the upper plate portion 23 of the sliding member 20 is pushed downward by the tip end portion of the operating arm 16B, such that the sliding protrusion 22 of the sliding member 20 is pushed onto the bottom surface portion 6A1 of the fixed rail 6A.

Here, as shown in FIG. 2, the sliding member 20 is set in a space where a portion of the slide rail 6B has been cut out. The upper plate portion 23 of the sliding member 20 is pulled out toward the inside in the seat width direction from the slide rail 6B such that the surface is exposed on the upper side with respect to the seat. As a result, the operating arm 16B is able to face and engage with the upper plate portion 23 of the sliding member 20 without going inside the slide rail 6B.

Incidentally, an elongated hole 16D that extends straight in the longitudinal direction of the third operating link 16 is formed in a link portion of the third operating link 16 that extends to the left in the drawing. A slide pin 17 that can slide along the shape of the elongated hole 16D is interlocked with the elongated hole 16D. The slide pin 17 is also fit into an elongated hole 33C formed in a seventh operating link 33, that will be described later. When the seat cushion 3 is in a down position, in which it is laid down forward such that it can be sat on, the slide pin 17 is kept in a position near the left edge portion in the drawing inside the elongated hole 16D of the third operating link 16 by the rotated position of the seventh operating link 33.

Figure 4:
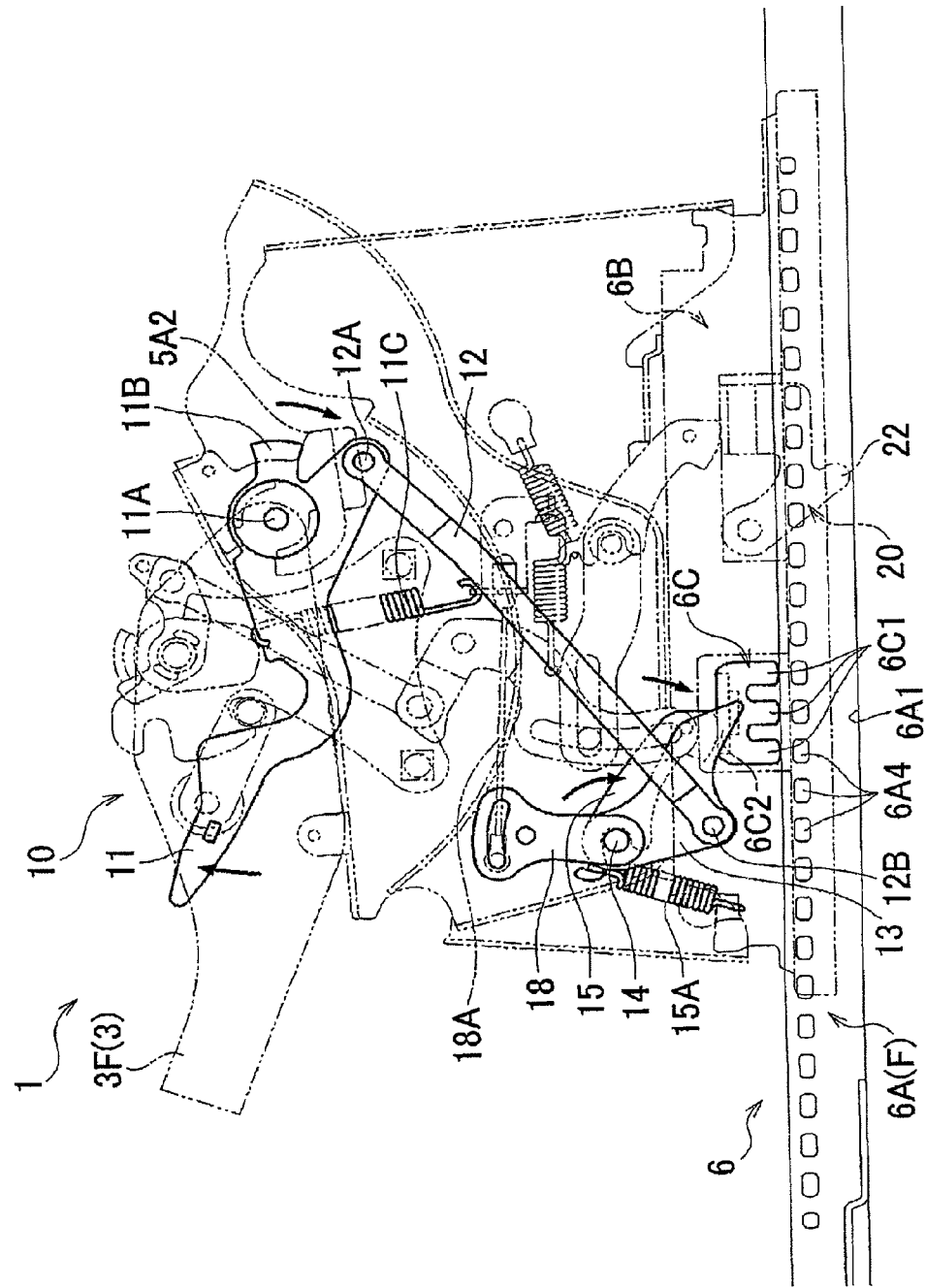
FIG. 4 is a side view of a release lever that has been pulled up from the state shown in FIG. 3.

With the unlocking mechanism 10 in the structure described above, when the release lever 11 is pulled up while seat main body 1 is positioned within the seat-usable range shown in FIG. 3, the second operating link 13 is rotated clockwise via the first operating link 12, as shown in FIG. 4, such that the release member 15 that is integrated with this second operating link 13 rotates in the same direction. As a result, the push plate portion 6C2 of the locking device 6C of the slider devices 6 is pushed downward, such that the locking device 6C becomes unlocked.

As a result, the seat main body 1 becomes unlocked and thus can be slid in the longitudinal direction of the vehicle along the fixed rail 6A. When the seat main body 1 is in the seat-usable range, i.e., when the sliding member 20 is in a range within which it slides on the bottom surface portion 6A1 of the fixed rail 6A, the seat main body 1 can be locked again by releasing (i.e., lowering) the release lever 11.

However, as shown in FIG. 5, when the seat main body 1 is slid from the seat-usable range to the unusable range, i.e., when the seat main body 1 is slid to a position where the sliding member 20 rides up on the raised, step portion 6A6 of the fixed rail 6A, the operating arm 16B is pushed up by the upper plate portion 23 of the sliding member 20 that has ridden up on the step, and as a result, the third operating link 16 is pushed around counterclockwise. Accordingly, the slide pin 17 that is engaged near the left end portion of the elongated hole 16D of the third operating link 16 in the drawing presses against the upper surface of the second operating link 13, such that the second operating link 13 that has been rotated by the release lever 11 is restricted from rotating back (i.e., from rotating counterclockwise).

Figure 6:
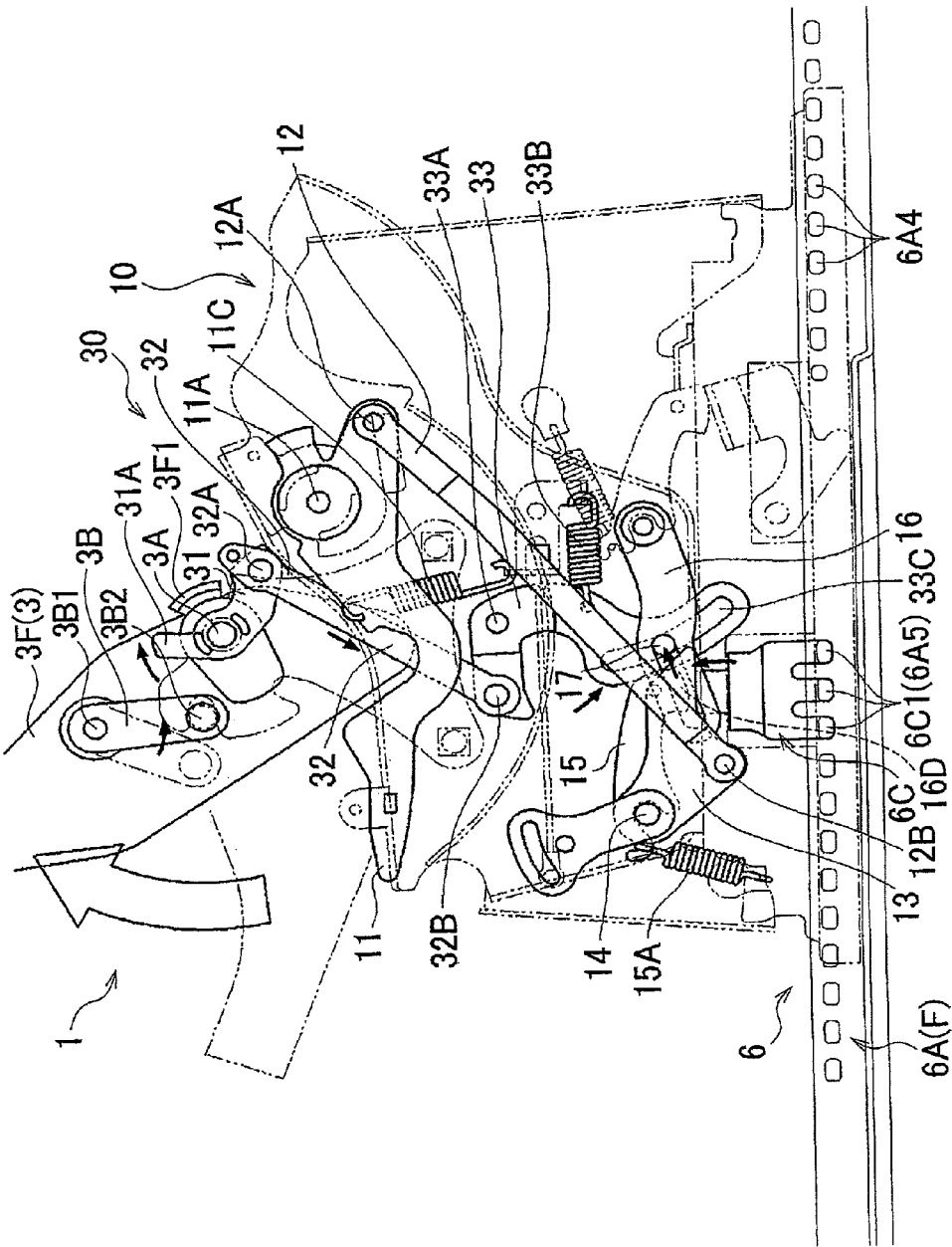
FIG. 6 is a side view of a seat cushion that has been tipped up from the state shown in FIG. 5.

However, even if the release lever 11 is released (i.e., lowered) while the sliding member 20 is riding on the raised step portion 6A6, the locking device 6C of the slider devices 6 is kept unlocked, so the seat main body 1 will not lock in the unusable range. However, from this state, the locking device 6C can be switched to a locked state by operating the walk-in lever, not shown, and flipping the seat cushion 3 up toward the rear so that it is in a tipped up position, which operates the unlocking operation canceling mechanism 30, to be described later, that brings the slide pin 17 out of the state in which it is pushed against the upper surface of the second operating link 13, as shown in FIG. 6.

Next, the structure of the unlocking operation canceling mechanism 30 will be described. The unlocking operation canceling mechanism 30 has a fifth operating link 31, a sixth operating link 32, and a seventh operating link 33, as shown in FIGS. 2 to 3. Here, the seventh operating link 33 serves as a link that forms the unlocking operation canceling mechanism of the invention. The fifth operating link 31 is rotatably connected to the fixed plate 5B that is integrated with the base plate 5, by the connecting shaft 3A. The sixth operating link 32 is a long link, with the upper end portion in the drawing rotatably connected by a connecting pin 32A to an end portion of an arm of the fifth operating link 31 that extends farther toward the rear than the connecting shaft 3A, and the lower end portion in the drawing rotatably connected to the upper end portion of the seventh operating link 33 by the connecting pin 32B.

The seventh operating link 33 is rotatably connected to the base plate 5 by the connecting shaft 33A. The elongated hole 33C that curves in the longitudinal direction of the seventh operating link 33 is formed in a link portion that extends downward in the drawing. The slide pin 17 that is fit into the elongated hole 16D of the third operating link 16 is interlocked so as to be able to slide along the elongated hole 33C. The seventh operating link 33 is constantly urged to rotate counterclockwise by the urging force of a tension spring 33B that is strung between the seventh operating link 33 and the base plate 5, as shown in FIG. 3.

When this seventh operating link 33 rotates counterclockwise by the urging force of the tension spring 33B, the fifth operating link 31 is urged to rotate clockwise via the sixth operating link 32, and the arm portion 31A on the left side in the drawing is stopped in a position abutting against an engaging plate 3F1 that is integrally formed with the cushion frame 3F. In the unlocking operation canceling mechanism 30 having the structure described above, as shown in FIG. 6, when the seat cushion 3 is flipped up to the rear and placed in the tipped up position by operating the walk-in lever, the engaging plate 3F1 formed on the cushion frame 3F moves away from the arm portion 31A on the left side in the drawing of the fifth operating link 31, such that the fifth operating link 31, the sixth operating link 32, and the seventh operating link 33 each rotate by being pulled on by the urging force of the tension spring 33B.

More specifically, rotation by the urging of the tension spring 33B causes the seventh operating link 33 to rotate counterclockwise about the connecting shaft 33A, such that the slide pin 17 that is fit into the elongated hole 33C slides along the elongated hole 16D of the third operating link 16 into a position at the end portion on the right side in the drawing. As a result, the slide pin 17 is brought out of the state in which it is pushed against the upper surface of the second operating line 13, such that the locking device 6C that had been unlocked by the release mechanism 15 can be locked.

Therefore, the seat main body 1 can be locked in the unusable range by switching the seat main body 1 to the tipped up position as described above. Incidentally, the seat main body 1 may also be slid from a position in the seat-usable range to a position in the unusable range and then locked, after switching the seat main body 1 to the tipped up position by operating the walk-in lever.

Figure 7:
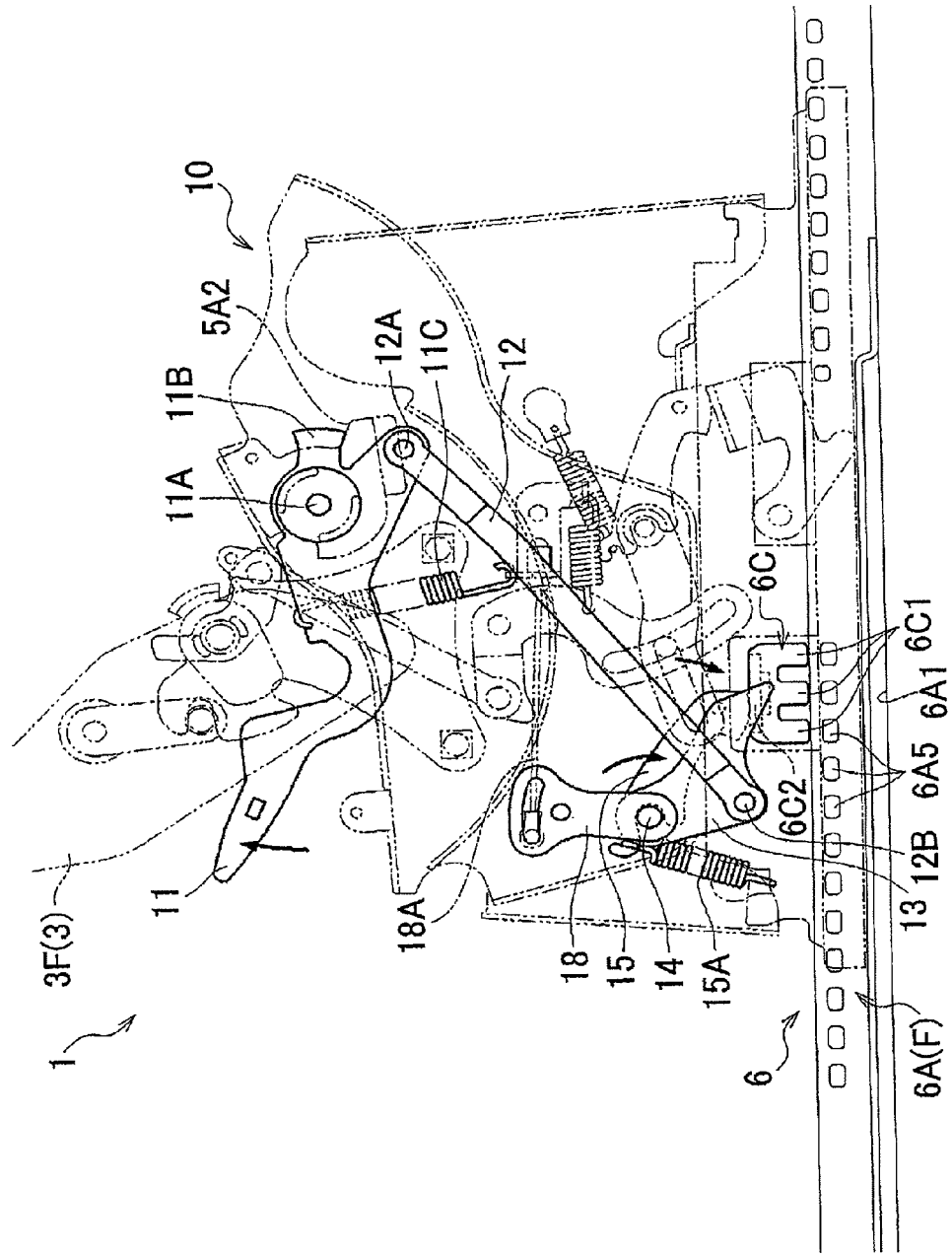
FIG. 7 is a side view of the release lever after it has been pulled up from the state shown in FIG. 6.

Next, a method for returning the seat main body 1 from a state in which it is in the tipped up position and locked in the unusable range to the original position in which it can be used for sitting on in a position in the seat-usable range will be described. First, the locking device 6C is unlocked by the release member 15 via the first operating link 12 and the second operating link 13, by pulling up oh the release lever 11, as shown in FIG. 7. This unlocks the seat main body 1.

Figure 8:
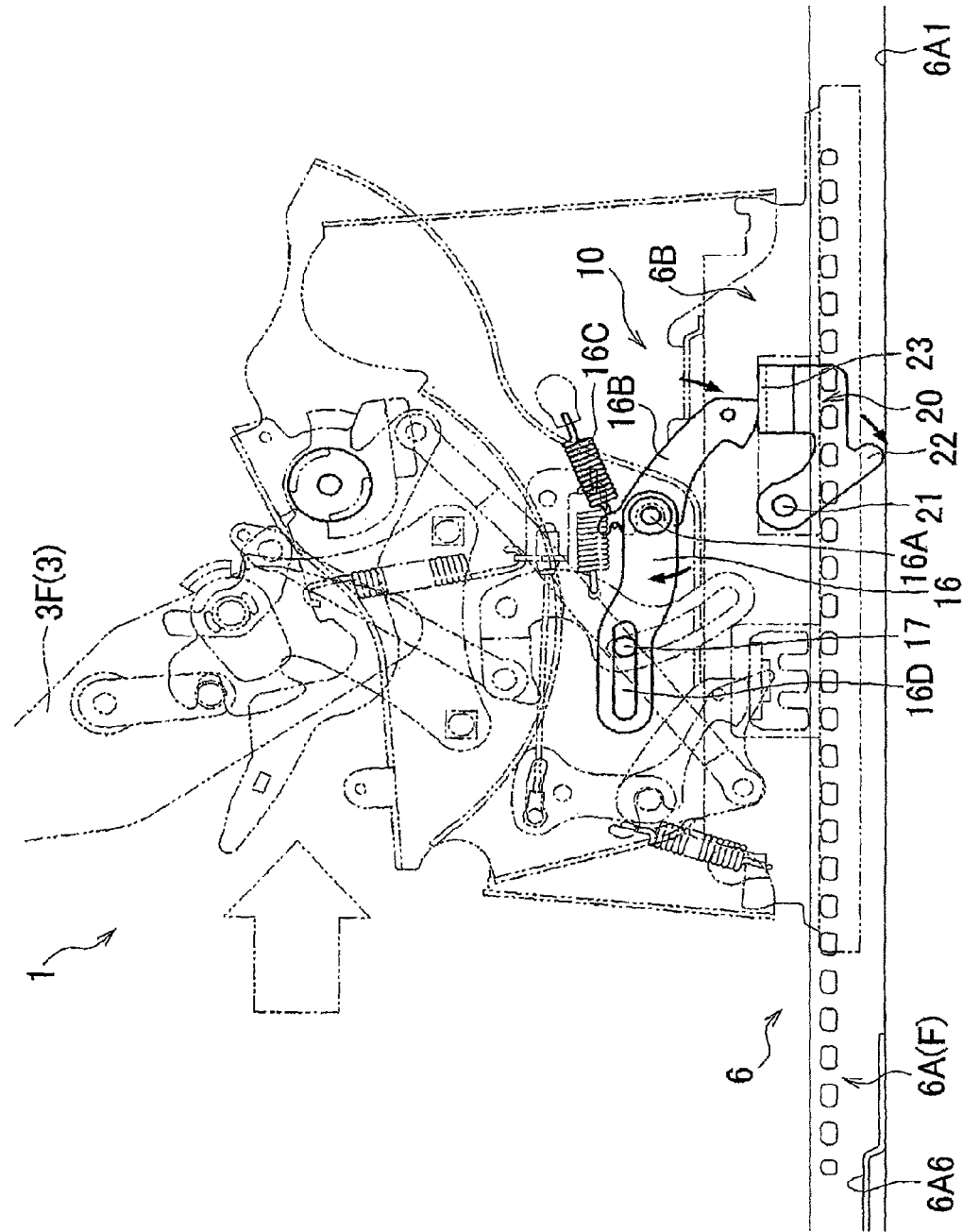
FIG. 8 is a side view of the seat main body that has been slid to the seat-usable range from the state shown in FIG. 7.
Figure 9:
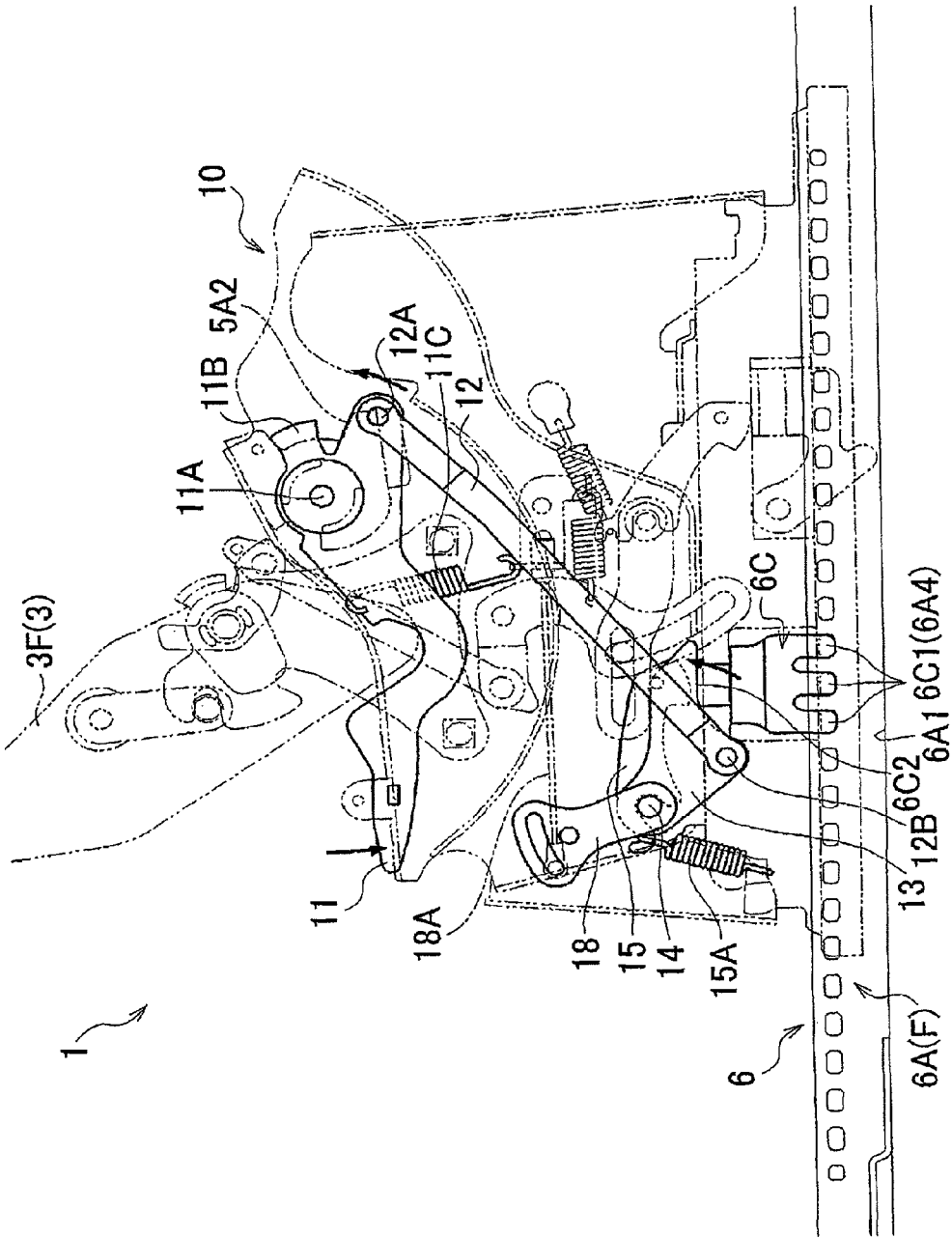
FIG. 9 is a side view of the release lever after it has been returned from the state shown in FIG. 8.
Figure 10:
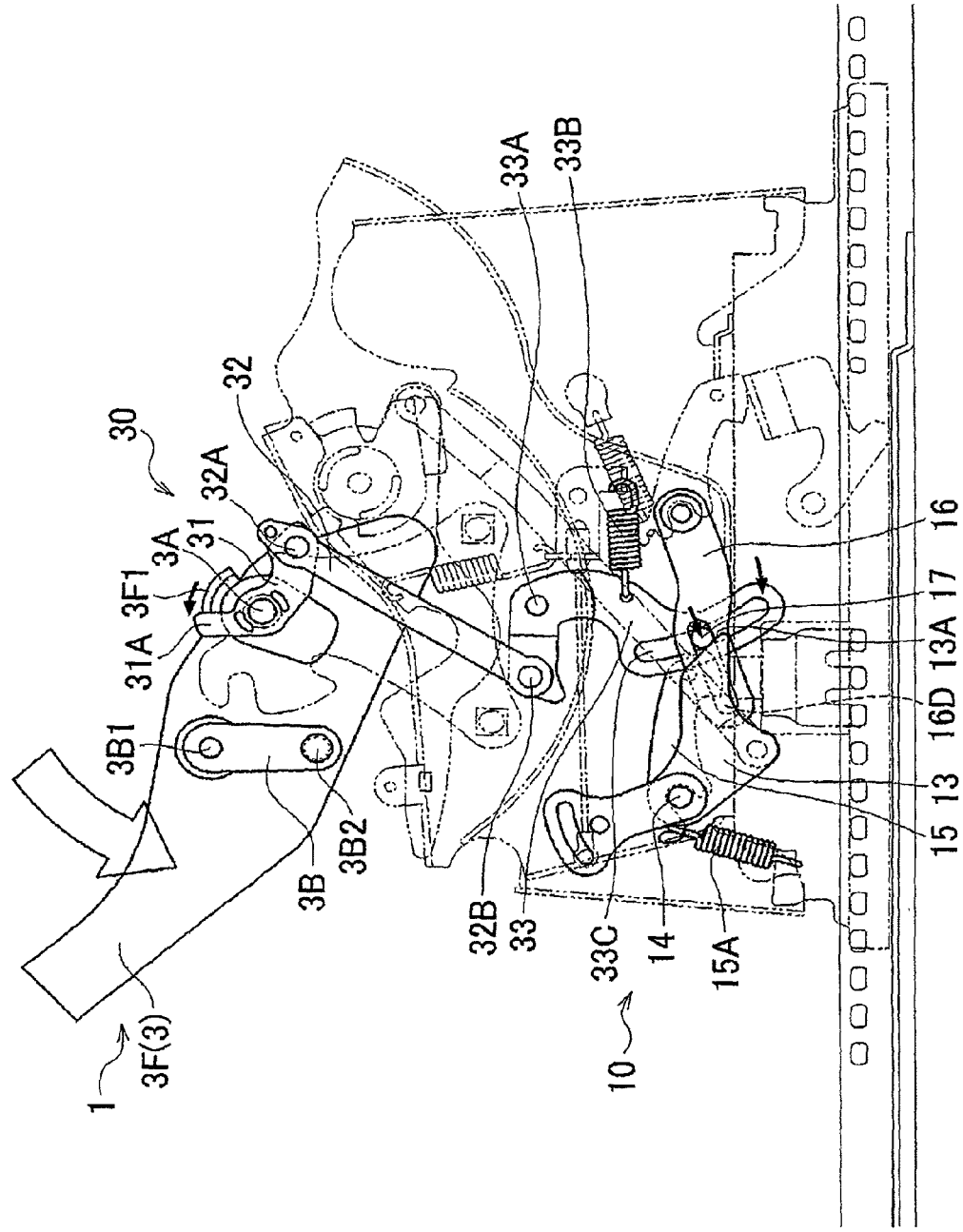
FIG. 10 is a side view showing the seat cushion in the middle of being lowered from the state shown in FIG. 6 to its original position after having been in a tipped up position.

Next, the seat main body 1 is slid to the rear with respect to the vehicle until the sliding member 20 drops down off of the raised step portion 6A6 of the fixed rail 6A onto the bottom surface portion 6A1, as shown in FIG. 8. Accordingly, the operating arm 16B stops being being pushed up by the sliding member 20, such that the third operating link 16 is pulled up in the clockwise direction. As a result, even if the seat cushion 3 returns to a sittable position by laying down forward, the locking device 6C can still be locked by releasing (i.e., lowering) the release lever 11 (see FIG. 9).

Incidentally, if the release lever 11 is released and the seat cushion 3 is laid down forward from the tipped up position while the seat main body 1 is being moved from a position in the unusable range in FIG. 7 to a position in the seat-usable range in FIG. 8, the slide pin 17 will slide to the left in the drawing inside the elongated hole 16D of the third operating link 16 and abut against the tapered surface 13A that is slanted upward with respect to the second operating link 13 as the seventh operating link 33 rotates clockwise.

Therefore, when the seat cushion 3 is laid down forward even further from this state, the slide pin 17 slides further to the left in the drawing inside the elongated hole 16D of the third operating link 16, and pushes down on the tapered surface 13A of the second operating link 13 such that the slide pin 17 comes to be in the state shown in FIG. 5, in which it is riding on the upper surface of the second operating link 13. That is, as the second operating link 13 is pushed down and around, the release member 15 pushes down on the push plate portion 6C2 of the locking device 6C, thus preventing the seat main body 1 from being locked.

In this way, according to the vehicle seat of this example embodiment, the locking device 6C that locks the seat main body 1 in the seat-usable range is kept unlocked by the unlocking mechanism 10 operating as a result of the sliding member 20 riding up on the step of the fixed rail 6A (i.e., the raised step portion 6A6), when the seat main body 1 is moved into the unusable range. Therefore, the seat main body 1 can be prevented from being used to sit on in the unusable range.

Meanwhile, in the unusable range as well, the seat main body 1 can be locked by switching the seat cushion 3 to the tipped up position, which results in the operation by the unlocking mechanism 10 to unlock the locking device 6C being canceled by the unlocking operation canceling mechanism 30. In this way, the seat main body 1 is able to be locked in the seat-usable range, as well as locked in the unusable range by being placed in the tipped up position, using only one type of locking device 6C.

Also, the slide pin 17 is able to slide while being engaged with the links 16 and 33, following the movements of these links 16 and 33, using the mechanism that slides the slide pin 17 inside the elongated holes 16D and 33C of the links 16 and 33 as the mechanism by which the operation by the unlocking mechanism 10 to unlock the locking device 6C is canceled by the unlocking operation canceling mechanism 30. Thus, the operation by the unlocking mechanism 10 to unlock the locking device 6C and the operation by the unlocking operation canceling mechanism 30 to cancel this unlocking operation by the unlocking mechanism 10 are able to be stably performed.

Also, the upper surface of the upper plate portion 23 of the sliding member 20 is provided exposed above the slide rail 6B, so the operating arm 16B can easily be assembled protruding from the seat main body 1 and facing the upper surface of the sliding mechanism 20 provided inside the slide rail 6B.

While the invention has been described with reference to one example embodiment thereof, it should be understood that the invention may be carried out in various modes in addition to the example embodiment described above. In the example embodiment described above, the raised step portion 6A6 that rises in a step-like manner from the bottom surface portion 6A1 of the fixed rail 6A is given as an example of a step portion on which the sliding member 20 rides in the unusable range. Alternatively, however, the step portion may also be formed as a lowered step portion in which the step portion drops down in step-like manner. Also, the step portion may be formed on the side portion 6A2 of the fixed rail 6A and structured to push the sliding member 20 against the side portion 6A2.

Further, in the example embodiment described above, when the sliding member 20 rides up on the raised step portion 6A6 (i.e., the step portion), the sliding member 20 rotates as a result, and pushes up on the operating arm 16B. Alternatively, however, the structure may be such that the operating arm 16B operates with linear movement vertically as a result of the sliding member 20 riding on up the step portion. Also, in the example embodiment described above, the unusable range is set to a position in front of the seat-usable range in the longitudinal direction of the vehicle, but the unusable range may alternatively be set to a position to the rear of the seat-usable range in the longitudinal direction of the vehicle.

Also, in the example embodiment described above, a mode in which the seat cushion 3 is hinged at the rear end portion and flips up toward the rear is given as the mode in which the seat cushion 3 is flipped up to the tipped up position. Alternatively, however, the seat cushion 3 may be hinged at the front end portion and flipped up toward the front.

What is claimed is:

1. A vehicle seat that is slidably provided on a vehicle floor, comprising:
   a fixed rail that is fixed onto the vehicle floor;
   a slide rail that is slidably assembled to the fixed rail;
   a seat main body being provided on an upper portion of the slide rail;
   a locking device that is provided on the slide rail and that locks the slide rail such that the slide rail will not slide, by engaging with the fixed rail; and
   a switching mechanism that switches the locking device between a locked state and an unlocked state,
   wherein the vehicle seat is configured such that the seat main body that is slidably provided on the vehicle floor is able to be locked so as not to slide when the seat main body is in a sittable position as well as when the seat main body is in a tipped up position in which a seat cushion is flipped up, in a preset seat-usable range, and the seat main body is able to be locked so as not to slide by being placed in the tipped up position, in a position in which the seat main body has been slid out of the seat-usable range and into an unusable range, and
   wherein the switching mechanism has a sliding member that is provided on the slide rail and that slides along a wall surface of the fixed rail, a step portion that is formed on the wall surface of the fixed rail and onto which the sliding member rides when the seat main body enters the unusable range, an unlocking mechanism that is provided on the seat main body and that unlocks the locking device and keeps the locking device unlocked in response to movement of the sliding member as the sliding member rides onto the step portion, and an unlocking operation canceling mechanism that is provided on the seat main body and that cancels an operation by the unlocking mechanism to unlock the locking device when the seat cushion is flipped up into the tipped up position.

2. The vehicle seat according to claim 1, wherein the unlocking mechanism includes a link that is connected to the locking device, and a first elongated hole that extends in a longitudinal direction of the link is provided in the link,
   wherein the unlocking operation canceling mechanism includes a link that is connected to the locking device, and a second elongated hole that extends in a longitudinal direction of the link is provided in the link,
   wherein the link of the unlocking mechanism and the link of the unlocking operation canceling mechanism are connected together by a slide pin that slides in the first elongated hole and the second elongated hole,
   wherein the unlocking mechanism keeps the locking device unlocked by having the link of the unlocking mechanism rotate in response to the movement of the sliding member, such that the slide pin pushes on the locking device, and
   wherein when the seat cushion is in the tipped up position the unlocking operation canceling mechanism stops the slide pin from pushing on the locking device by having the link of the unlocking operation canceling mechanism rotate such that the slide pin slides along the first elongated hole in the link of the unlocking mechanism.

3. The vehicle seat according to claim 1, wherein the unlocking mechanism includes an operating arm that is operated by the sliding member and extends out from the seat main body, and the operating arm is arranged facing an upper surface of the sliding member; and the upper surface of the sliding member is provided exposed above the slide rail.

* * * * *